United States Patent
Hüger et al.

(10) Patent No.: US 12,229,671 B2
(45) Date of Patent: Feb. 18, 2025

(54) METHOD AND DEVICE FOR OPTIMIZED OPERATION OF A MACHINE LEARNING MODEL WITH A DATA STACK FOR A DRIVING ASSISTANCE FUNCTION OF A VEHICLE

(71) Applicant: Volkswagen Aktiengesellschaft, Wolfsburg (DE)

(72) Inventors: Fabian Hüger, Wolfenbüttel (DE); Peter Schlicht, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 913 days.

(21) Appl. No.: 17/414,675

(22) PCT Filed: Nov. 25, 2019

(86) PCT No.: PCT/EP2019/082486
§ 371 (c)(1),
(2) Date: Jun. 16, 2021

(87) PCT Pub. No.: WO2020/126339
PCT Pub. Date: Jun. 25, 2020

(65) Prior Publication Data
US 2022/0044118 A1   Feb. 10, 2022

(30) Foreign Application Priority Data

Dec. 18, 2018   (DE) .................. 10 2018 222 202.9

(51) Int. Cl.
G06V 20/58       (2022.01)
G06F 17/16      (2006.01)
(Continued)

(52) U.S. Cl.
CPC ............... *G06N 3/08* (2013.01); *G06F 17/16* (2013.01); *G06F 18/214* (2023.01);
(Continued)

(58) Field of Classification Search
CPC ............ G06N 3/08; G06N 3/045; G06N 7/01; G06N 20/10; G06F 17/16; G06F 18/214;
(Continued)

(56) References Cited

U.S. PATENT DOCUMENTS 6,898,328 B2 * 5/2005 Carrig, Jr. ................. G06T 5/77
382/300
9,889,859 B2   2/2018 Tatourian et al.
(Continued)

FOREIGN PATENT DOCUMENTS

CN      107481188 A    12/2017   .............. G06K 9/62
DE   112016005866 T5    9/2018   ............ B60W 30/14
(Continued)

OTHER PUBLICATIONS

Zheng, Heliang et al., "Learning Multi-Attention Convolutional Neural Network for Fine-Grained Image Recognition," 2017 IEEE International Conference on Computer Vision (ICCV), pp. 5209-5217, Oct. 22, 2017.
(Continued)

*Primary Examiner* — K C Chen
(74) *Attorney, Agent, or Firm* — Slayden Grubert Beard PLLC (57) ABSTRACT

The invention relates to a method for operating a machine learning model, comprising the following steps during a training phase: receiving selected multidimensional training data; selecting subsets from the received training data; generating a training data set, wherein the training data set includes data set elements which are generated on the basis of the selected subsets; training the machine learning model
(Continued)

using the training data set; and/or comprising the following steps during an inference phase: receiving sensor data of at least one sensor; selecting subsets from the received sensor data; generating a data stack, wherein the data stack includes the respective selected subsets as stack elements; applying the, or a, machine learning model trained according to the steps of the training phase to every stack element of the data stack, wherein the application occurs simultaneously, and deducing an inference result; and outputting the inference result.

14 Claims, 3 Drawing Sheets

(51) Int. Cl.
*G06F 18/214* (2023.01)
*G06N 3/08* (2023.01)
*G06V 10/44* (2022.01)
*G06V 10/764* (2022.01)
*G06V 10/82* (2022.01)
*G06V 40/10* (2022.01)

(52) U.S. Cl.
CPC .......... *G06V 10/454* (2022.01); *G06V 10/764* (2022.01); *G06V 10/82* (2022.01); *G06V 20/58* (2022.01); *G06V 40/103* (2022.01)

(58) Field of Classification Search
CPC .... G06V 10/454; G06V 10/764; G06V 10/82; G06V 20/58; G06V 40/103
See application file for complete search history.

(56) References Cited

U.S. PATENT DOCUMENTS

| | | | |
|---|---|---|---|
| 2017/0174227 A1 | 6/2017 | Tatourian et al. | ............... 701/28 |
| 2017/0200063 A1 | 7/2017 | Nariyambut Murali et al. | |
| 2018/0060725 A1 | 3/2018 | Groh et al. | |
| 2018/0150684 A1 | 5/2018 | Wang et al. | |
| 2018/0240221 A1 | 8/2018 | Rijnders | |
| 2018/0259970 A1 | 9/2018 | Wang et al. | |
| 2018/0260956 A1 | 9/2018 | Huang et al. | |
| 2020/0143241 A1* | 5/2020 | Gao | ....... G06F 18/217 |

FOREIGN PATENT DOCUMENTS

| | | | | |
|---|---|---|---|---|
| DE | 102018222202 A1 | 6/2020 | ............... | G06K 9/62 |
| EP | 3171292 A1 | 5/2017 | ............... | G06K 9/00 |
| EP | 3291172 A1 | 3/2018 | ............... | G06T 5/00 |
| WO | 2020/126339 A1 | 6/2020 | ............... | G06K 9/00 |

OTHER PUBLICATIONS

Junginger, Andrej et al., "Unpaired High-Resolution and Scalable Style Transfer Using Generative Adversarial Networks," URL: https://arxiv.org/abs/1810.05724v1, 19 pages, Oct. 2018.
German Office Action, Application No. 102018222202.9, 7 pages, Dec. 20, 2019.
International Search Report and Written Opinion, Application No. PCT/EP2019/082486, 20 pages, Feb. 7, 2020.
Mayo, Matthew, "Parallelism in Machine Learning: GPUs, CUDA, and Practical Applications," KD Nuggets, URL: https://www.kdnuggets.com/2016/11/parallelism-machine-learning-gpu-cuda-threading.html, 5 pages, Nov. 10, 2016.

* cited by examiner

METHOD AND DEVICE FOR OPTIMIZED OPERATION OF A MACHINE LEARNING MODEL WITH A DATA STACK FOR A DRIVING ASSISTANCE FUNCTION OF A VEHICLE

CROSS-REFERENCE TO RELATED APPLICATIONS

This application claims priority to German Patent Application No. DE 10 2018 222 202.9, filed on Dec. 18, 2018 with the German Patent and Trademark Office. The contents of the aforesaid Patent Application are incorporated herein for all purposes.

TECHNICAL FIELD

The invention relates to a method and a device for operating a machine learning model.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Machine learning and deep neural networks are increasingly being used in vehicles, for example in infotainment systems, driver assistance systems, security systems, convenience functions and semi-automated or automated driving. For example, deep learning functions are also used, in which sensor data captured by means of a sensor (e.g., environment sensor system, interior monitoring, sensors in or on the vehicle, etc.) are used to produce higher-value data, for example in the form of an environment model, object recognition, a control system, or a driver model.

Machine learning models and, For example, deep neural networks are very computationally intensive during application, i.e., during an inference phase when executed in the vehicle. In particular with regard to application in the field of automated driving with stringent redundancy requirements for software or hardware used, the computing power required for a function must be reduced.

SUMMARY

An object exists to provide a method and a device for operating a machine learning model, in which the machine learning model may be operated with less effort, for example in terms of a computing power required during an inference phase.

The object is solved by a method and a device according to the independent claims. Embodiments of the invention are described in the dependent claims, the following description, and the drawings.

DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In a first exemplary aspect, a method is provided for operating a machine learning model, comprising the following steps during a training phase:
receiving tagged multidimensional training data,
selecting subsets from the received training data,
generating a training data set, wherein the training data set includes data set elements which are generated on the basis of the selected subsets,
training the machine learning model by means of the training data set,
and/or comprising the following steps during an inference phase:
receiving sensor data of at least one sensor,
selecting subsets from the received sensor data,
generating a data stack, wherein the data stack includes the respective selected subsets as stack elements,
applying the, or a, machine learning model trained according to the steps of the training phase to every stack element of the data stack, wherein the application occurs simultaneously, and deducing an inference result,
outputting the inference result.

Furthermore and in a second exemplary aspect, a device is provided for operating a machine learning model, comprising a computing apparatus having a memory in which the machine learning model is formed, wherein the computing apparatus is configured to carry out the following steps during a training phase:
receiving tagged multidimensional training data,
selecting subsets from the training data,
generating a training data set, wherein the training data set includes data set elements which are generated on the basis of the selected subsets,
training the machine learning model by means of the training data set,
and/or to carry out the following steps during an inference phase:
receiving sensor data of at least one sensor,
selecting subsets from the received sensor data,
generating a data stack, wherein the data stack includes the respective selected subsets as stack elements,
applying the, or a, machine learning model trained according to the steps of the training phase to every stack element of the data stack, wherein the application occurs simultaneously, and deducing an inference result,
outputting the inference result.

A basic exemplary concept of the teachings herein is to break down input data of a machine learning model into smaller subsets both during training and in the inference phase during application of the machine learning model. If, for example, the training data used as the input data and the sensor data are image data of a camera, the subsets may be image sections from an image captured by the camera. The image sections have fewer pixels than the original image, so that fewer input data have to be processed by the machine learning model during training as well as during application. Therefore, subsets are selected from tagged (labeled) multidimensional training data. A training data set is then generated from the selected subsets, wherein individual data set elements of the training data set are in each case generated on the basis of one of the selected subsets. For example, if in the above-mentioned example five pedestrians are shown in an image of the camera, they may each be cropped from the image as an image section or subset and each be incorporated as a data set element into the training data set. Subsequently, the machine learning model is trained using the training data set provided. Since the subsets are individually less substantial, the machine learning model may be made smaller with regard to its input dimensions, i.e., it is compressed. As a result, a computing power required for applying the machine learning model during an inference phase may be reduced. In the inference phase, sensor data are received from at least one sensor. Subsets are also selected from said sensor data. In the example described, these may again be image sections of an image captured by means of a camera. After selection, a data stack is generated, wherein the data stack includes the respective selected subsets as stack elements, for example the respective above-described image sections. A machine learning model trained according to the steps of the training phase of the method is subsequently applied to each stack element of the data stack. This occurs in parallel, i.e., simultaneously, such that the trained machine learning model is in each case applied to one stack element of the data stack. For this purpose, the trained machine learning model is instantiated, i.e., generated, for example multiple times. By means of the parallel application, respective inferred results are available for all stack elements at the same time. After the machine learning model has been applied, the inference result composed of the inferred results is output. Since the trained machine learning model is designed to be less complex with respect to an input dimension, the computing power required in the inference phase is reduced, even though the machine learning model is applied to all stack elements at the same time. As a result, a required computing power may therefore be reduced both in the training phase and in the inference phase.

The method and the device may in some embodiments be applied within the scope of environment recognition on the basis of captured sensor data or image data of the environment.

In some embodiments, the method and the device may be used in a vehicle, for example to support an assistance system during automated driving.

A vehicle is for example a motor vehicle, for example a semi-autonomously or autonomously driven motor vehicle. However, the vehicle may in principle be any other land, air or water vehicle.

The method is divided into a training phase, in which the machine learning model is trained, and an inference phase, in which a trained machine learning model is applied to sensor data. It may for example be provided that the training phase and the inference phase are not carried out by means of the same device. For example, a machine learning model may be trained on a device at the premises of a manufacturer of a vehicle. The already trained machine learning model is then installed in another device in order to provide a perception function in an assistance system of the vehicle. This is where the trained machine learning model is applied in order to recognize, for example, objects in an environment of the vehicle in the captured sensor data. Only the inference phase is executed in the device for this purpose.

However, alternatively or additionally and in some embodiments, both parts of the method may be executed on a single device, for example in a vehicle.

The method is executed, e.g., by means of a computing apparatus having a memory. For example, the machine learning model is formed in the memory here, and the computing apparatus is configured to adapt the weights or parameters, etc., of the machine learning model during training depending on an inferred result and at least one target function.

The input data of the machine learning model, i.e., the training data and the sensor data, may for example be images captured by means of a camera, for example individual video images. However, input data may also be captured by means of other sensors, for example by means of a radar sensor, a light detection and ranging (LIDAR) sensor or an ultrasound sensor.

The machine learning model processes the input data, i.e., training data and sensor data, e.g., image data, in a lower resolution than they are provided by a sensor. For example, it is provided that the resolution is reduced. Depending on the type of machine learning model used, a variable resolution of the input data or a fixed resolution may be provided. In the case of deep neural networks, a resolution of the input data is variable for so-called fully convolutional networks, for example. However, other topologies of deep neural networks require a fixed resolution of the input data. The reduced input data are the respective subsets in the method.

When the machine learning model is trained and applied, the training data or sensor data provided by the at least one sensor may be reduced to a resolution processed by the machine learning model in the input data in a variety of ways.

For example, by means of downsampling, a reduction both in a resolution, e.g., a number of pixels, and in a number of tags (labels) may be achieved in the training data.

Furthermore, segments having a corresponding resolution may be extracted from the training data or sensor data. If, for example, the data are image data, segments having the corresponding resolution, size or number of pixels may be extracted from the image data. In this connection, it is possible to extract the segments from an image center and/or along a horizon.

It is for example provided that the individual inferred results of the stack elements output as a stack are then merged or combined into a single result. In the example, in which the subsets are image sections of an image captured by means of a camera, at least the part of the image that was taken into consideration by selecting the relevant subsets may then be recomposed and provided as a whole image, i.e., for example as a single model prediction. The merging may be done, for example, by means of corresponding masks, such that the subsets are inserted at the relevant original position of the sensor data or image. In this connection, it may be provided that the subsets are shifted in terms of a position and/or scaled in terms of a resolution in order to shift them back to an original position and/or bring them back to an original resolution.

When applying the machine learning model to the data stack, it is possible for individual stack elements to overlap with one another in terms of the subsets contained therein, i.e., the respective subsets have a common intersection. In the example of an image data used as subsets, image sections may for example overlap with one another in the image. The respective inferred results supplied for the individual subsets may be merged into one result for overlapping regions, for example fused with one another. This may be done in a variety of ways. It may be provided that the overlapping regions are set off against one another, for example by calculating an average, a weighted average or locally weighted averages. It may further be provided that decision-making methods are applied in order to use a suitable mask for the merging, for example the smallest, largest or an object-specific mask. Moreover, a decision may be made based on a confidence score determined for the relevant subset involved or based on a prediction result. For example, the prediction with the highest confidence or the most frequent prediction may be used. Furthermore, a distance to a mask or image center and/or a mask or image edge may be used. Fusion methods trained by means of machine learning may also be used, for example methods that fuse the results on the basis of a context, semantics or training experience.

It may further be provided that metadata likewise inferred by the machine learning model, for example an associated confidence score and/or an associated robustness, are fused with one another.

In principle, the machine learning model may be any suitable model created by means of machine learning that may be trained on the basis of tagged training data in a training phase and that may then be applied to sensor data in an inference phase. Examples of suitable machine learning models include support vector machines, neural networks and probabilistic models, for example based on Bayesian networks.

In some embodiments, the machine learning model is a deep neural network.

In some embodiments, it is provided that the subsets are selected during the training phase and/or during the inference phase based on a relevance of the respective subsets. If the training data and sensor data are, for example, image data of a camera, only relevant regions in these image data may be taken into consideration. As a result, attention may be focused within the input data processed by the machine learning model. A relevance results, for example, from consideration of criteria such as safety (e.g., vulnerable road users in the training data and/or in the sensor data) or particularly high-contrast or low-contrast image regions.

It may further be provided that a relevance of subsets is determined based on a prior evaluation. If, for example, sensor data are regularly captured, for example images of an environment by means of a camera, it may be provided that a relevance of subsets, in the example a relevance of individual image sections, are based on an image captured and evaluated in an earlier time step. If, for example, a vulnerable road user was recognized in an earlier image, the corresponding image section may be tagged with a high relevance and selected as a subset in a current time step on account of this tag.

It may also be provided that a list of relevant subsets, for example image sections, is created from the training data and sensor data and the selection takes place on the basis of the list created, for example simply by selecting the most relevant 5, 10, 20, etc., subsets.

In some embodiments, it is provided that the subsets are selected from the training data and/or the received sensor data additionally or alternatively on the basis of a situation-dependent context. If, for example, the training data and sensor data are image data of a camera, it may be provided that different image sections are selected as subsets depending on a situation-dependent context. For example, the selected subsets may be selected differently during travel on a highway than during travel in a city. For example, lanes of a three-lane highway extending to the left and right of a vehicle are of greater relevance, since they offer potential evasion opportunities for the vehicle. In contrast, during city travel, a cycle lane may be of greater relevance, since a vulnerable road user may be located thereon. Accordingly, the subsets are selected depending on the situation. As a result, situations identified as critical may also be better taken into consideration. For example, a crosswalk or a child playing on a section of road ahead may be better taken into consideration if these image sections are selected as subsets.

It may further be provided that a planned route is interpreted as context or used to determine a situation-dependent context for at least one current point in time. The route may for example be queried from a navigation apparatus of a vehicle. The respective subsets may then be selected depending on the specific nature of individual subroutes that are relevant at least for a current point in time. In this connection, other information in addition to the route may be taken into consideration, for example the road properties, current or future weather, a weather condition, traffic reports, etc.

It may further be provided that the selection of the subsets or the generation of the data stack is made dependent on results of the inference phase of a method carried out at an earlier point in time. In this regard, expected or predicted shifts of relevant subsets in the sensor data may for example be taken into consideration. For example, movements and/or perspective changes of image sections in images of a camera captured at different points in time may be taken into consideration. Saliency methods may also be applied here (e.g., optical flow, trained saliency methods, heatmapping for a previous point in time).

In some embodiments, it is provided that at least one confidence score is determined and/or output for the machine learning model, wherein the at least one confidence score is determined and/or output separately for at least two selected subsets and/or stack elements. In this way, a confidence score may be specified separately for each of the subsets or each of the stack elements. This makes it possible, for example, to create spatially resolved confidence information. Based on this spatially resolved confidence information, it may for example be decided whether specific regions in the surroundings or specific parts in the sensor data must be captured and/or evaluated again or more precisely in future runs of the method. The confidence score is, for example, a confidence value with regard to the relevant inference result, e.g., an object class or an object size, etc. For example, a confidence value of this kind indicates the probability of the trained machine learning model being able to determine a relevant viewed object or the corresponding size. The confidence score therefore defines the accuracy of a perception or of an inferred result of the trained machine learning model. If an object class is pedestrians, for example, the confidence value indicates that the trained machine learning model may recognize the object "pedestrian" with a probability of, e.g., 99% when a pedestrian is recognized. If the machine learning model is a deep neural network, the confidence score may for example be determined by statistically evaluating inference results when the trained deep neural network is applied repeatedly to the same or similar input data. If a Monte Carlo dropout method, in which individual neurons are randomly switched off with each application, is used with the deep neural network, then a confidence for the inferred result may be determined by means of multiple inference, i.e., by repeatedly applying the deep neural network to the same input data. The results inferred multiple times are evaluated by means of statistical methods and a confidence value is derived herefrom.

It may further be provided that the subsets are selected or the data stack is generated depending on a confidence score of individual subsets determined for an earlier point in time. For example, image sections of an image captured at an earlier point in time for which a low confidence was determined in the inferred result may be taken into consideration by selecting corresponding image sections in an image taken at a later point in time.

In some embodiments, it is provided that, in order to train the machine learning model, the data set elements in the training data set are merged into one matrix, wherein the computing operations required for the training are executed on the matrix and/or, in order to apply the trained machine learning model, the stack elements in the data stack are merged into one matrix, wherein the computing operations required for the inference are executed on the matrix. The term "matrix" is for example used to denote a hypermatrix, i.e., a matrix with more than two indices. If, for example, the training data and the sensor data are two-dimensional data, for example image data of an image of a camera, the respectively selected subsets will also be two-dimensional. The two-dimensional subsets are then merged into a three-dimensional matrix. The training and the application are then carried out in each case on the three-dimensional matrix. As a result, a required computing power may be reduced further.

In some embodiments, it is provided that a data resolution at the input of the machine learning model and/or a number of stack elements of the data stack is set depending on a computing power available during application of the trained machine learning model and/or a maximum possible latency time. In this way, a machine learning model may be tailored to an application scenario. If, for example, a maximum latency time of 30 milliseconds is provided for a perception function in a vehicle, because a decision of an assistance system must subsequently be made on the basis of an inference result, the machine learning model is designed such that the 30 milliseconds never elapse during application in the inference phase. In order to achieve this, a data resolution, for example a number of pixels in image data, and/or a number of stack elements of the data stack may be changed. For example, a compromise is sought between computing power or computing time and a quantity of input data processed.

In some embodiments, it is provided that, when the machine learning model is trained, a target function is selected or predefined separately for at least one of the subsets. As a result, the machine learning model may be trained in a manner targeted to specific properties of the subset. In the case of a deep neural network used as the machine learning model, loss or cost functions dependent on the image section may for example be used. The benefit of this is that the training phase may be expedited as a result.

Furthermore, a vehicle is provided in some embodiments, comprising at least one device according to any one of the embodiments described herein.

Moreover and in some embodiments, a computer program having program code is provided in order to carry out all steps of the method in any one of the embodiments described, if the program is executed on a computer.

Furthermore and in some embodiments, a computer program product having program code is provided, which program code are saved on a computer-readable data storage medium, in order to carry out the method according to any one of the embodiments described, if the program product is executed on a computer.

In the following, the invention will be explained in more detail based on further exemplary embodiments and with reference to the FIGS.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

Figure 1:
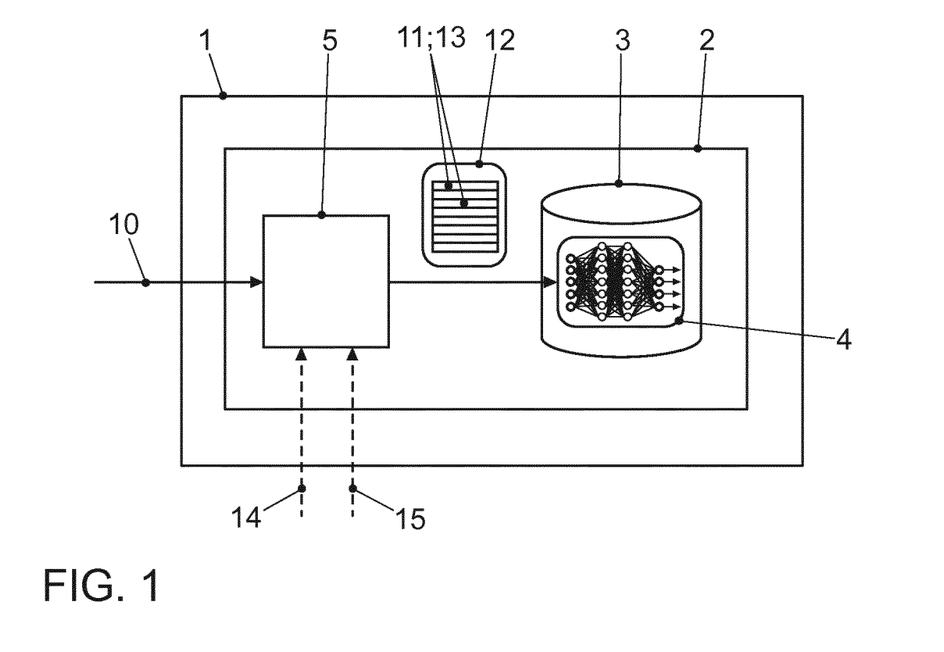
FIG. 1 is a schematic representation of an embodiment of the device for operating a machine learning model (training phase)

FIG. 1 is a schematic representation of an embodiment of the device 1 for operating a machine learning model 6 during a training phase. The machine learning model 6 is a deep neural network 4 in the exemplary embodiment shown. The device 1 comprises a computing apparatus 2 having a memory 3. The deep neural network 4 is formed in the memory 3, i.e., the structural features of the neural network and associated weightings are stored in the memory.

During the training phase of the deep neural network 4, the computing apparatus 2 receives tagged multidimensional training data 10. Subsequently, the computing apparatus 2 selects subsets 11 from the training data 10. For this purpose, the computing apparatus 2 comprises a selection apparatus 5.

In this connection, it may be provided that the selection apparatus 5 selects the subsets 11 based on a relevance 14 of the subset 11 in question. Specifications for the relevance 14 may be provided to the selection apparatus 5 for example from outside.

It may further be provided that the selection apparatus 5 additionally or alternatively selects the subsets 11 based on a situation-dependent context 15. A current context 15 may be provided to the selection apparatus 5 for example from outside.

The selection apparatus 5 then provides a training data set 12, wherein the training data set 12 is compiled from data set elements 13 that were each generated by the selection apparatus 5 on the basis of the selected subsets 11.

The deep neural network 4 is then trained using the training data set 12 compiled in this manner. The training is carried out by the computing apparatus 2.

It may be provided that at least one confidence score is determined and/or output for the deep neural network 4 after the training. The confidence score for example indicates the probability of the deep neural network 4 being able to correctly recognize a particular result after the training, for example that the neural network 4 may correctly recognize the object "pedestrian" with a probability of 98% after the training.

Figure 2:
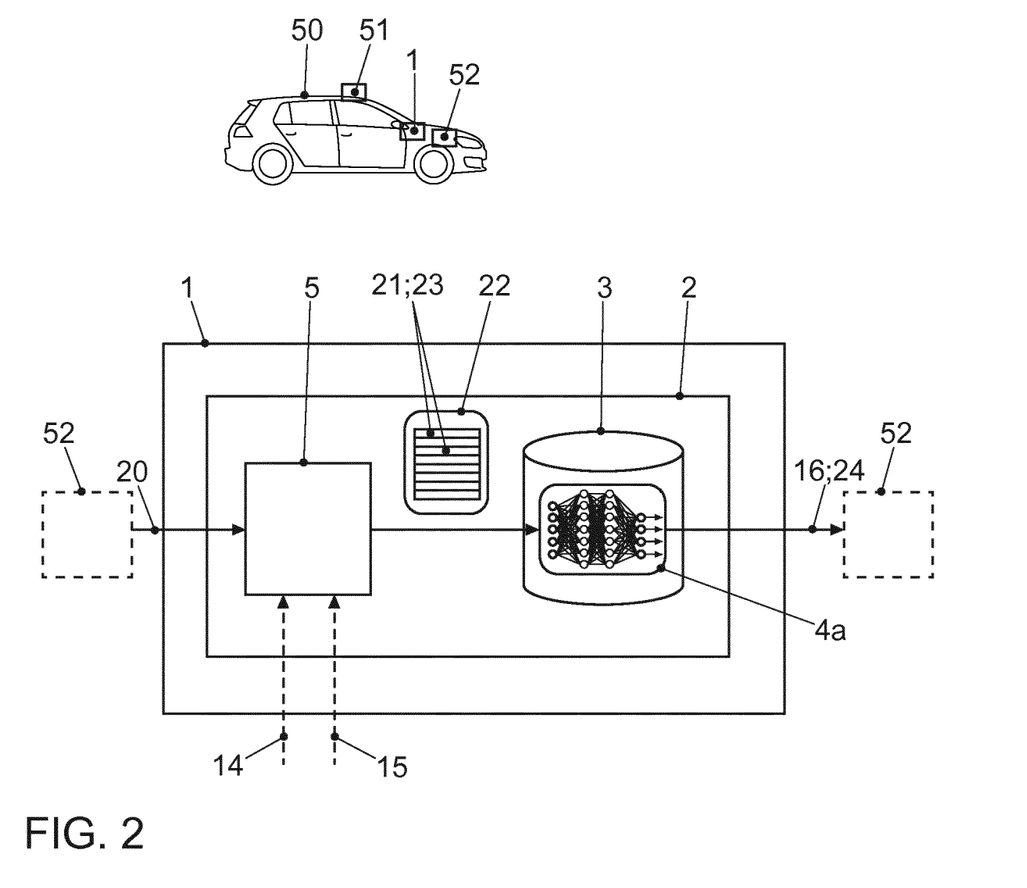
FIG. 2 is a schematic representation of an embodiment of the device for operating a machine learning model (inference phase)

FIG. 2 is a schematic representation of an embodiment of the device 1 for operating a trained machine learning model 6a during an inference phase, wherein the trained machine learning model 6a is a trained deep neural network 4a. The device 1 may be designed to execute the inference phase or to apply the trained deep neural network 4a in a vehicle 50, for example.

The device 1 comprises a computing apparatus 2 having a memory 3. The trained deep neural network 4a is formed in the memory 3, i.e., the structural features of the network and the weightings set during the training phase (cf. FIGS. 1 and 3) are stored in the memory.

During the inference phase of the trained deep neural network 4a, the computing apparatus 2 receives multidimensional sensor data 20 of a sensor 52. The sensor 52 is, for example, a top-view camera of the vehicle 50, which provides image data in the form of captured images of an environment of the vehicle 50 as the sensor data 20. Subsequently, the computing apparatus 2 selects subsets 21 from the received sensor data 20. For this purpose, the computing apparatus 2 comprises a selection apparatus 5.

In this connection, it may be provided that the selection apparatus 5 selects the subsets 21 based on a relevance 14 of the subset 21 in question. Specifications for the relevance 14 may be provided to the selection apparatus 5 for example from outside.

It may further be provided that the selection apparatus 5 additionally or alternatively selects the subsets 21 based on a situation-dependent context 15. A current context 15 may be provided to the selection apparatus 5 for example from outside.

It is provided here for example that the specifications for the relevance 14 and/or for the situation-dependent context 15 during the inference phase correspond to the specifications during the training phase.

The selection apparatus 5 generates a data stack 22 from the selected subsets 21, wherein the data stack 22 includes the respective selected subsets 21 as stack elements 23. The data stack 22 is fed to the trained deep neural network 4a.

The trained deep neural network 4a is then applied to the data stack 22. For this purpose, multiple instances of the trained deep neural network 4a are generated by the computing apparatus 2 at the same time, wherein a number corresponds to a number of stack elements 23 in the data stack 22. Subsequently, the computing apparatus 2 feeds one of the stack elements 23 to each individual instance of the trained deep neural network 4a at the same time. The instances of the trained deep neural network deliver one inferred result in each case. The inferred results are also provided as a stack or in aggregate form as an inference result 24.

The inference result 24 is subsequently output, for example as a digital data packet. The output takes place, for example, by means of an interface (not shown) provided for this purpose. The output inference result 24 may then be processed further, for example by an assistance system 52 of the vehicle 50 within the scope of interpreting the environment or in order to plan a trajectory of the vehicle 50.

It may be provided that at least one confidence score 16 is determined and/or output for the trained deep neural network 4a. In this connection, it is provided that the at least one confidence score 16 is determined and/or output separately for at least two stack elements 23. Put simply, a confidence value 16 may be given for each result inferred for a stack element 23, i.e., for example an indication of the probability of the trained deep neural network 4a correctly recognizing the relevant inferred result, i.e., a measure of the accuracy or reliability of the relevant inferred result.

Figure 3:
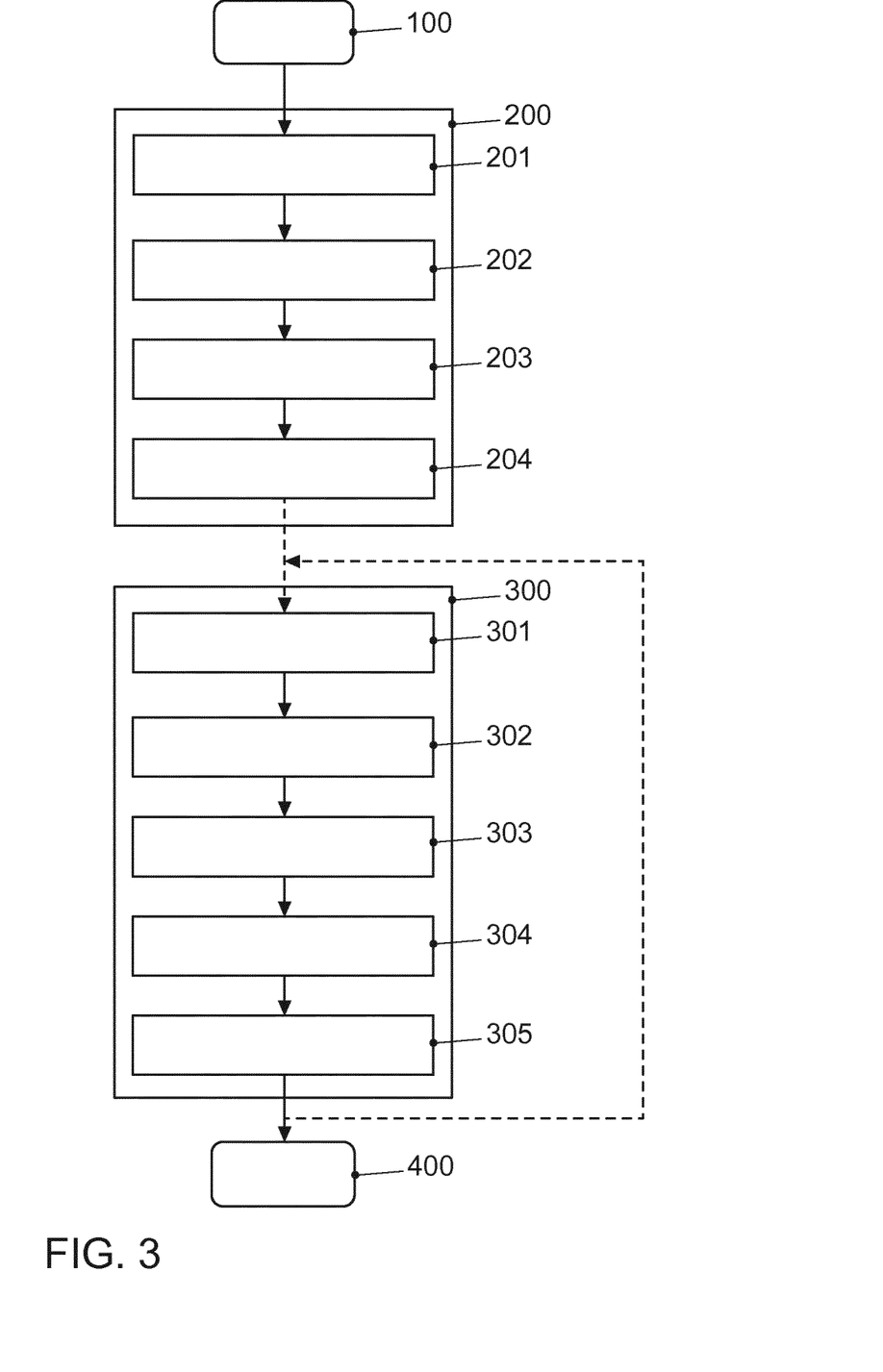
FIG. 3 is a schematic flow diagram of an embodiment of the method for operating a machine learning model.

FIG. 3 is a schematic flow diagram of an embodiment of the method for operating a machine learning model. The machine learning model is a deep neural network in the embodiment shown. The method may be divided into two parts: a training phase 200 and an inference phase 300. These may be carried out both individually and together.

After the method is started 100, the method steps 201 to 204 are performed in the training phase 200.

In a method step 201, tagged multidimensional training data are received. Said data may for example be images of the environment captured by a camera, for example the environment of a vehicle. The images are tagged (labeled), i.e., information relating to the objects and/or the size, properties, etc., thereof present in the images is assigned to the images.

In a method step 202, subsets are selected from the training data. In the example, said training data are image sections from the images. If, for example, it is an image of a street scene, image sections containing pedestrians may be selected as subsets. The subsets or image sections may then be processed further, for example a resolution or pixel number may be adapted to an input dimension of the deep neural network.

It may be provided that the subsets are selected during the training phase based on a relevance of the respective subsets. For example, the subsets or image sections may be selected depending on a safety-related property of the depicted object. In this way, for example, vulnerable road users such as pedestrians may be assigned a high relevance and thus for example taken into consideration when the subsets or image sections are selected. In addition, properties of an image itself may be used to derive a relevance. For example, low-contrast and thus poorly visible image sections may be assigned a high relevance such that said image sections are selected as subsets.

Additionally or alternatively, it may be provided that the subsets are selected from the training data based on a situation-dependent context. For example, other subsets or image sections may be taken into consideration during selection depending on the current situation. On a highway, regions on lanes of the highway are relevant, for example, whereas traffic lights and pedestrians are generally not found there. In contrast, in city traffic, traffic lights, pedestrians and other objects, for example more vulnerable road users, should, e.g., be taken into consideration during selection.

It may be provided that a data resolution at the input of the deep neural network is set depending on a computing power available during application of the trained deep neural network and/or a maximum possible latency time. The available computing power and/or the maximum possible latency time are predetermined, for example, by hardware of a vehicle. The data resolution is then selected such that the available computing power and/or the maximum possible latency time are never fully used up.

In a method step 203, a training data set is provided. The training data set includes data set elements which are each generated from the selected subsets. Since a selection has taken place, a complete (for example high-resolution) image is no longer required for training the deep neural network. The training takes place merely with the aid of the individual (low-resolution) subsets, which were merged as data set elements in the data set. As a result, firstly, the deep neural network is compressed. A dimension of the input data of the deep neural network may be reduced, thus saving computing power and computing time. Secondly, attention may be focused, since only subsets or image sections deemed to be relevant, for example, may be taken into consideration for the training.

In a method step 204, the deep neural network is trained by means of the training data set. Machine learning methods that are known per se may be used for this.

It may be provided that a target function for at least one of the subsets is selected or predefined separately during training of the deep neural network. For example, a target function may be used specially for specific subsets or image sections. As a result, a training phase may be expedited.

It may further be provided that the data set elements in the training data set are merged into a matrix for the training of the deep neural network, wherein the computing operations required for the training are executed on the matrix. As a result, the processing of the training data set for training the deep neural network may be expedited.

At the end of the training phase 200, a trained deep neural network is available which may be used in a subsequent inference phase.

The inference phase 300 may be carried out independently of the training phase 200. For example, the inference phase 300 may be carried out in a vehicle in order to provide an assistance function. A deep neural network trained according to the training phase 200 is used for this purpose. The trained deep neural network is stored, for example, by a manufacturer of the vehicle in the memory of a device of the like described in FIG. 2 and may then be used in a subsequent inference phase 300 when the vehicle is sent out to a client.

The inference phase 300 comprises the method steps 301 to 305.

In a method step 301, sensor data are received from at least one sensor. In the example already described above, the sensor data are for example an image of the environment of the vehicle captured by means of a camera.

In a method step 302, subsets are selected from the received sensor data. In the example described, the subsets are image sections of the image.

It may be provided that the subsets are selected during the inference phase based on a relevance of the respective subsets. For example, the subsets or image sections may be selected depending on a safety-related property of an object shown therein. For example, vulnerable road users such as pedestrians may be assigned a high relevance and thus for example taken into consideration when the subsets or image sections are selected. In addition, properties of an image itself may be used to derive a relevance. For example, low-contrast and thus poorly visible image sections may be assigned a high relevance such that said image sections are selected as subsets.

Additionally or alternatively, it may be provided that the subsets are selected from the sensor data based on a situation-dependent context. For example, other subsets or image sections may be taken into consideration during selection depending on the current situation. On a highway, regions in lanes of the highway are relevant, for example, whereas traffic lights and pedestrians are generally not found there. In contrast, in city traffic, traffic lights, pedestrians and other objects, for example more vulnerable road users, should for example be taken into consideration during selection.

It may be further provided that the subsets are additionally or alternatively selected based on a selection of a subset selected at an earlier point in time or at an earlier time step. For example, if the inference phase is carried out repeatedly, it may be provided that image sections of an image captured at an earlier point in time that are deemed to be relevant or an inference result of an earlier run of the inference phase serve as the starting point for the selection. If an inference result for example shows that there is a pedestrian in an image, the associated image section in an image captured at a later point in time may also be selected. In this connection, it may be provided that the subsets or image sections are selected using saliency methods (human saliency or machine saliency, e.g., optical flow, trained saliency methods, heat-mapping methods at a previous time step, etc.).

In a method step 303, a data stack is generated. The data stack comprises stack elements that are each generated from the selected subsets.

In the methods steps 302 or 303, it may be provided that a number of stack elements of the data stack are set depending on a computing power available during application of the trained deep neural network and/or a maximum possible latency time. The available computing power and/or the maximum possible latency time are predetermined, for example, by hardware of a vehicle. The number of stack elements is then selected such that the available computing power and/or the maximum possible latency time are never fully used up.

In a method step 304, the trained deep neural network is applied to the data stack. For this purpose, an instance of the trained deep neural network is generated for each stack element and each instance is then fed one of the stack elements. The individual instances then provide an inferred result for each stack element, i.e., for each subset or each image section. The inferred results are merged into an inference result. The merging may for example also include mask-based generation of a single image from the subsets or the individual inferred results, such that a single image with the associated inferred results may be provided. For example, in this way, an image with objects classified therein and associated object positions may be provided.

In a method step 305, the inference result is output, for example as a digital data packet. The inference result or digital data packet may then be provided to an assistance system of a vehicle.

The method is then terminated 400.

It may be provided that the inference phase of the method is then repeated, wherein sensor data captured at a later point in time are evaluated.

In the embodiments shown in FIGS. 1 to 3, the machine learning model 6, 6a is a deep neural network 4, 4a. However, in principle, the machine learning model 6 may also be designed differently, for example in the form of a support vector machine or in the form of a probabilistic model. The training phase and the inference phase are then carried out analogously for these machine learning models 6, 6a.

LIST OF REFERENCE NUMERALS

1 Device
2 Computing apparatus
3 Memory
4 Deep neural network
4a Trained deep neural network
5 Selection apparatus
6 Machine learning model
6a Trained machine learning model
10 Training data
11 Subset
12 Training data set
13 Data set element
14 Relevance
15 Situation-dependent context
16 Confidence score
20 Sensor data
21 Subset
22 Data stack
23 Stack element
24 Inference result
50 Vehicle
51 Sensor 52 Assistance system
100 Method step
200 Training phase
201-204 Method steps
301-305 Method steps
300 Inference phase
400 Method step

What is claimed is:

1. A method for optimized operation of a machine learning model in a vehicle using a driving assistance function, comprising, during a training phase:
    receiving tagged multidimensional training data from one or more cameras, which training data comprise images from surroundings of one or more training vehicles;
    selecting subsets from the received training data to compress input dimensions of the machine learning model, wherein the subsets are image sections of the images, wherein the selection of the subsets is carried out on based on a relevance of the respective subsets, wherein the subsets are selected depending on a security-relevant property of an object depicted in the subsets or the image section, wherein low-contrast subsets or image sections are selected;
    generating a training data set, wherein the training data set includes data set elements which are generated on the basis of the selected subsets;
    training the machine learning model for a driving assistance function of the vehicle using the training data set;
    conducting, during an inference phase, conducted as a part of the driving assistance function of the vehicle during automated driving;
    receiving sensor data of at least one image sensor, which sensor data comprises images from surroundings of the vehicle;
    selecting subsets from the received sensor data, wherein the subsets are image sections, wherein the selection of the subsets is carried out based on a relevance of the respective subsets, wherein the subsets are selected depending on a safety-relevant property of an object depicted in the subset or the image section, wherein low-contrast subsets or image sections are selected;
    generating a data stack, wherein the data stack comprises the respective selected subsets as stack elements, wherein a data resolution at an input of the machine learning model and a number of stack elements of the data stack is set depending on a computing power available during application of the trained machine learning model and a maximum possible latency time, wherein the computing power available and the maximum possible latency time are not fully used up;
    applying the machine learning model trained according to the steps of the training phase to every stack element of the data stack, wherein the application occurs simultaneously; and deducing an inference result; and
    outputting the inference result.

2. The method of claim 1, wherein the machine learning model is a deep neural network.

3. The method of claim 2, wherein the subsets are selected from the training data and the received sensor data additionally or alternatively on the basis of a situation-dependent context.

4. The method of claim 2, wherein at least one confidence score is determined and output for the machine learning model, wherein the at least one confidence score is determined and output separately for at least two selected subsets and stack elements.

5. The method of claim 2, wherein,
    in order to train the machine learning model, the data set elements in the training data set are merged into one matrix, wherein computing operations required for training are executed on the matrix;
    in order to apply the trained machine learning model, the stack elements in the data stack are merged into one matrix, wherein computing operations required for inference are executed on the matrix.

6. The method of claim 1, wherein the subsets are selected from the training data and the received sensor data additionally or alternatively on the basis of a situation-dependent context.

7. The method of claim 6, wherein at least one confidence score is determined and output for the machine learning model, wherein the at least one confidence score is determined and output separately for at least two selected subsets and stack elements.

8. The method of claim 1, wherein at least one confidence score is determined and output for the machine learning model, wherein the at least one confidence score is determined and output separately for at least two selected subsets and stack elements.

9. The method of claim 1, wherein,
    in order to train the machine learning model, the data set elements in the training data set are merged into one matrix, wherein computing operations required for training are executed on the matrix;
    in order to apply the trained machine learning model, the stack elements in the data stack are merged into one matrix, wherein computing operations required for inference are executed on the matrix.

10. The method of claim 1, wherein, when the machine learning model is trained, a target function is selected or predefined separately for at least one of the subsets.

11. A non-transitory data storage medium having program code to carry out the method of claim 1 during execution of the program code on a computer or processor.

12. A device for optimized operation of a machine learning model in a vehicle using a driving assistance function, the device comprising:
    a computer having a memory in which the machine learning model is formed;
    wherein the computer is configured to, during a training phase:
        receiving tagged multidimensional training data from one or more cameras, which training data comprise images from surroundings of one or more training vehicles;
        selecting subsets from the received training data to compress input dimensions of the machine learning model, wherein the subsets are image sections of the images, wherein the selection of the subsets is carried out on based on a relevance of the respective subsets, wherein the subsets are selected depending on a security-relevant property of an object depicted in the subsets or the image section, wherein low-contrast subsets or image sections are selected;
        generating a training data set, wherein the training data set includes data set elements which are generated on the basis of the selected subsets;
        training the machine learning model for a driving assistance function of the vehicle using the training data set,
        conducting during an inference phase, conducted as a part of the driving assistance function of the vehicle during automated driving:

receiving sensor data from at least one image sensor, which sensor data comprises images from surroundings of the vehicle;

selecting subsets from the received sensor data, wherein the subsets are image sections, wherein the selection of the subsets is carried out based on a relevance of the respective subsets, wherein the subsets are selected depending on a safety-relevant property of an object depicted in the subset or the image section, wherein low-contrast subsets or image sections are selected;

generating a data stack, wherein the data stack comprises the respective selected subsets as stack elements, wherein a data resolution at an input of the machine learning model and a number of stack elements of the data stack is set depending on a computing power available during application of the trained machine learning model and a maximum possible latency time, wherein the computing power available and the maximum possible latency time are not fully used up;

applying the machine learning model trained according to the steps of the training phase to every stack element of the data stack, wherein the application occurs simultaneously, and deducing an inference result; and outputting the inference result.

13. The device of claim 12, wherein the machine learning model is a deep neural network.

14. A vehicle with a device for operating a machine learning model in a vehicle using a driving assistance function, the device comprising:

a computer having a memory in which the machine learning model is formed;

wherein the computer is configured to, during a training phase:

receiving tagged multidimensional training data from one or more cameras, which training data comprise images from surroundings of one or more training vehicles;

selecting subsets from the received training data, wherein the subsets are image sections of the images to compress input dimensions of the machine learning model, wherein the selection of the subsets is carried out on based on a relevance of the respective subsets, wherein the subsets are selected depending on a security-relevant property of an object depicted in the subsets or the image section, wherein low-contrast subsets or image sections are selected;

generating a training data set, wherein the training data set includes data set elements which are generated on the basis of the selected subsets;

training the machine learning model for a driving assistance function of the vehicle using the training data set, conducting during an inference phase, conducted as a part of the driving assistance function of the vehicle:

receiving sensor data from at least one image sensor, which sensor data comprises images from surroundings of the vehicle during automated driving;

selecting subsets from the received sensor data, wherein the subsets are image sections, wherein the selection of the subsets is carried out based on a relevance of the respective subsets, wherein the subsets are selected depending on a safety-relevant property of an object depicted in the subset or the image section, wherein low-contrast subsets or image sections are selected;

generating a data stack, wherein the data stack comprises the respective selected subsets as stack elements, wherein a data resolution at an input of the machine learning model and a number of stack elements of the data stack is set depending on a computing power available during application of the trained machine learning model and a maximum possible latency time, wherein the computing power available and the maximum possible latency time are not fully used up;

applying the machine learning model trained according to the steps of the training phase to every stack element of the data stack, wherein the application occurs simultaneously, and deducing an inference result; and outputting the inference result.

* * * * *